(12) United States Patent
Cresci et al.

(10) Patent No.: US 12,164,774 B2
(45) Date of Patent: Dec. 10, 2024

(54) PERFORMANCE THROTTLING MODULE

(71) Applicant: Micron Technology, Inc., Boise, ID (US)

(72) Inventors: Federica Cresci, Boise, ID (US); Nicola Del Gatto, Boise, ID (US); Emanuele Confanolieri, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 186 days.

(21) Appl. No.: 17/902,716

(22) Filed: Sep. 2, 2022

(65) Prior Publication Data

US 2023/0236729 A1 Jul. 27, 2023

Related U.S. Application Data

(60) Provisional application No. 63/303,908, filed on Jan. 27, 2022.

(51) Int. Cl.
*G06F 3/06* (2006.01)
*G06F 11/34* (2006.01)
(Continued)

(52) U.S. Cl.
CPC .......... *G06F 3/0613* (2013.01); *G06F 3/0653* (2013.01); *G06F 3/0673* (2013.01); *G06F 11/349* (2013.01); *G06F 12/0893* (2013.01); *G06F 9/4411* (2013.01); *G06F 2212/601* (2013.01)

(58) Field of Classification Search
CPC .... G06F 3/0613; G06F 3/0653; G06F 3/0673; G06F 11/349; G06F 12/0893; G06F 9/4411; G06F 2212/601; G06F 2212/502; G06F 11/3024; G06F 12/0895;
(Continued)

(56) References Cited

U.S. PATENT DOCUMENTS 6,892,312 B1* 5/2005 Johnson .............. G06F 11/3072
713/323
2005/0289292 A1* 12/2005 Morrow .................. G11C 5/14
711/167

(Continued)

*Primary Examiner* — Charles Rones
*Assistant Examiner* — Hewy H Li
(74) *Attorney, Agent, or Firm* — Wood IP LLC; Theodore A. Wood

(57) ABSTRACT

Provided is a method for regulating, via a hardware performance throttling block (PTB) of a memory module, the performance of a memory system in response to read and write requests from a processing system which hosts the memory system. The host system sends memory service requests to the memory system in the form of memory read requests and memory write requests. The host system sends requests to throttle, that is, to limit the responses of the memory system in response to memory requests; the host system sends to the memory system various parameters indicative of current memory usage. In response to the throttling request, the PTB of the memory module either stops any reception of memory requests, or limits (throttles) the number of memory read requests, write requests, or both for a specified number of clock/command cycles. The PTB also determines when full, un-throttled performance may be resumed.

16 Claims, 10 Drawing Sheets

(51) Int. Cl.
*G06F 12/0893* (2016.01)
*G06F 9/4401* (2018.01)

(58) Field of Classification Search
CPC .... G06F 2201/81; G06F 3/0659; G06F 1/329; Y02D 10/00; G05B 19/0428; G05B 2219/24024
See application file for complete search history.

(56) References Cited

U.S. PATENT DOCUMENTS

| | | | |
|---|---|---|---|
| 2008/0005511 A1* | 1/2008 | Laudon | G06F 13/1668 711/163 |
| 2012/0066439 A1* | 3/2012 | Fillingim | G06F 3/0653 711/E12.008 |
| 2014/0098600 A1* | 4/2014 | Kim | G11C 11/1655 365/158 |
| 2015/0261281 A1* | 9/2015 | Bickelman | G05D 23/1393 713/322 |
| 2015/0261473 A1* | 9/2015 | Matsuyama | G06F 3/0659 711/103 |
| 2015/0324135 A1* | 11/2015 | Chan | G06F 3/0689 711/146 |
| 2018/0314289 A1* | 11/2018 | Chabukswar | G06F 9/485 |
| 2021/0109587 A1* | 4/2021 | Mukker | G06F 1/206 |
| 2022/0147273 A1* | 5/2022 | Shin | G06F 3/0659 |
| 2022/0276800 A1* | 9/2022 | Savir | G06F 3/067 |

* cited by examiner

Exemplary CXL System Signals and Registers

810

| Signal or Flag | Description |
|---|---|
| i_clk | Input clock for Performance Throttling block |
| perf_throttling_enable | Performance Throttling Enable signal: temperature or power consumption limit exceeded |
| perf_throttling_rwd_backpressure | Performance Throttling RwD backpressure signal |
| perf_throttling_req_backpressure | Performance Throttling Req backpressure signal |
| workload_type | Traffic Type that is coming from Host in terms of Read Percentage (for example, 70% Read) |

815 i_clk
820 perf_throttling_enable
825 perf_throttling_rwd_backpressure
830 perf_throttling_req_backpressure
835 workload_type

850

| Register | Description |
|---|---|
| Throttling_Enable | Performance Throttling Enable register |
| TempThreshold_High | Temperature Threshold that triggers Performance Throttling start |
| TempThreshold_Low | Temperature Threshold that triggers Performance Throttling stop |
| CurrentThreshold_High | Current Threshold that triggers Performance Throttling start |
| CurrentThreshold_Low | Current Threshold that triggers Performance Throttling stop |
| ThrottlingLevel_RwD | Throttling Level for RwD commands (perf_throttling_rwd_backpressure period) |
| ThrottlingLevel_Req | Throttling Level for Req commands (perf_throttling_req_backpressure period) |

855 Throttling_Enable
860.2 TempThreshold_High
860.1 TempThreshold_Low
865.2 CurrentThreshold_High
865.1 CurrentThreshold_Low
870 ThrottlingLevel_RwD
875 ThrottlingLevel_Req

FIG. 8

PERFORMANCE THROTTLING MODULE

CROSS REFERENCE TO RELATED APPLICATIONS

This application claims benefit to U.S. Provisional Patent Application No. 63/303,908, file 27 Jan. 2022, and entitled "Old North Performance Throttling Management", the disclosure of which is incorporated herein in its entirety by reference.

TECHNICAL FIELD

The present disclosure relates generally to application-specific integrated circuits (ASICs). The present disclosure relates more particularly to preventing hardware-level problems due to excess heat, excess power consumption, or other physical conditions which may physically degrade an ASIC's performance. It further relates to regulating performance levels in an ASIC to prevent or reduce hardware problems induced by physical ASIC stressors.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Application specific integrated circuits (ASICs) may be designed and used for many different purposes in computers, cell phones, and other digital systems and control systems. For example, an ASIC may regulate access to dynamic random access memory (DRAM) by a computer's central processing unit (CPU) or by a cell phone's microprocessor. As a further example, a computer express link (CXL) ASIC may function as a controller to both regulate dynamic memory and to integrate different digital memory circuits according to recently emerging hardware standards.

A computer, cell phone, or other digital/control system may issue multiple service requests to an ASIC, including for example, memory read/write requests, service interrupts, or other forms of service requests to the ASIC (e.g., interrupt-driven requests for ASIC input/output (I/O) activities).

BRIEF DESCRIPTION OF THE DRAWINGS

Advantageous designs of embodiment of the present disclosure result from independent and dependent claims, the description, and the drawing. In the following, preferred examples of embodiments of the disclosure are explained in detail with the aid of the attached drawings. The drawings, which are incorporated herein and form part of the specification, illustrate the present disclosure and, together with the description, further serve to explain the principles of the disclosure and to enable a person skilled in the relevant art(s) to make and use the disclosure.

FIG. 8 illustrates an exemplary set of system signals and registers in a digital memory circuit.

DETAILED DESCRIPTION

Figure 1:
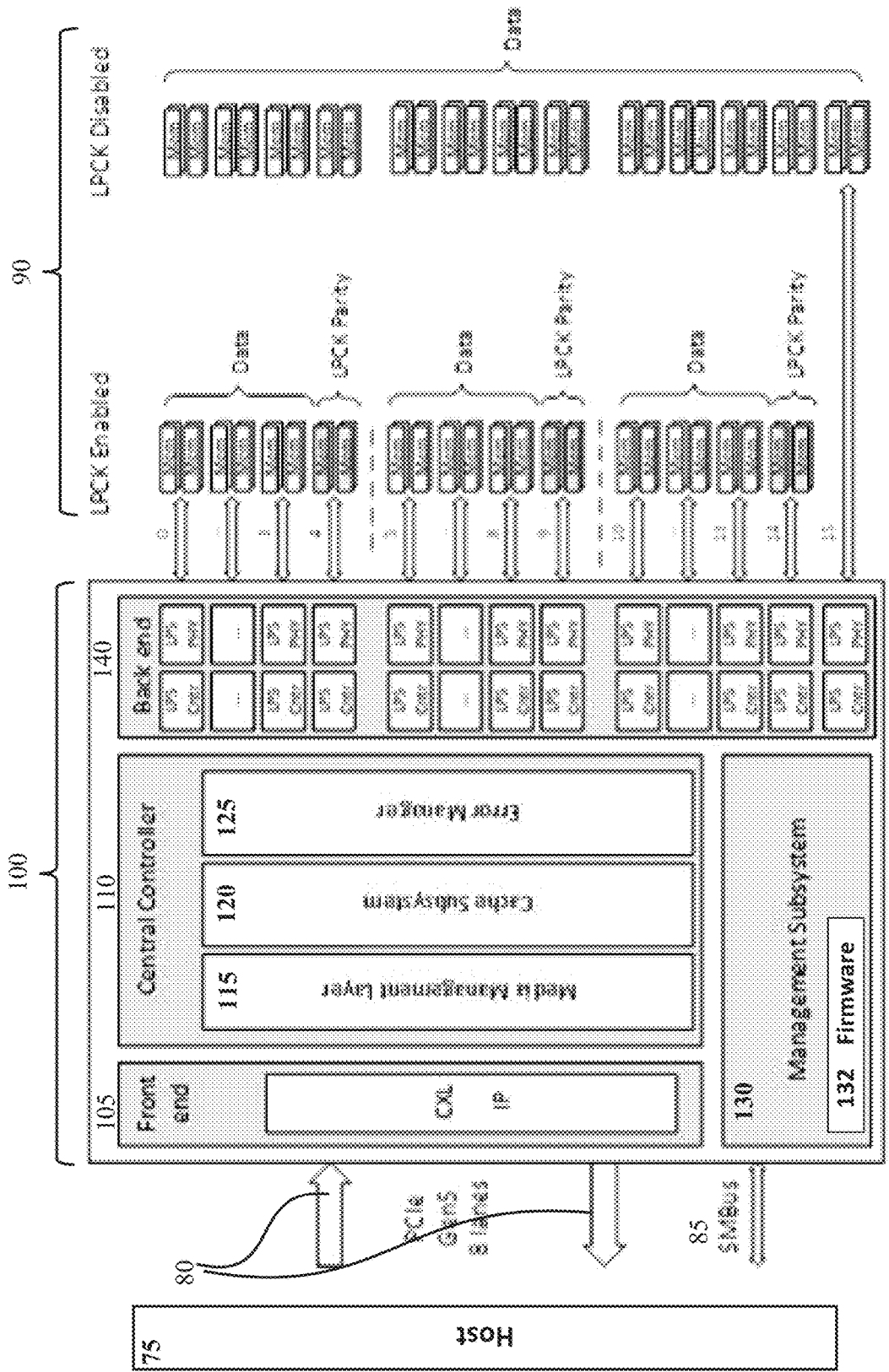
FIG. 1 illustrates an exemplary environment in which embodiments may be applied, specifically digital memory circuit which may be an exemplary CXL ASIC.

FIG. 1 illustrates an exemplary environment in which the embodiments may be applied, including an exemplary digital memory circuit the form of CXL ASIC 100.

CXL is an open standard, cache-coherent interconnect for processors, memory, and memory expansion. Essentially, CXL technology maintains memory coherency between a host device 75 memory space and memory on attached devices. (The host device, referred to in this document simply as the "host 75", typically has its own processor and other memory in addition to the CXL ASIC.) The host is a source of data write commands 205 and data read requests 220: The ASIC 100 receives memory access requests 205, 220 from the host 75 via a bus 80, such as a PCIe eight lane data bus 80; the ASIC 100 also returns data to the host 75 via the same bus 80. A service mastering bus (SMBus) 85 communicates control commands and CXL ASIC status to/from the host 75. The memory access requests 205, 220 may include either or both of memory data read/write requests 220/205 by the host 75.

The CXL ASIC 100 also reads and writes data from/to memory 90, which may be dynamic random access memory DRAM 90 or other kinds of suitable data storage, responsive to data requests from the host 75.

A front end 105 provides handling for CXL instructional protocols (IP) and interfacing, including interfacing with the PCIe bus 80, and handling of CXL.io (input/output) protocols and CXL mem (memory) protocols. A central controller 110 includes a media management layer (MML) 115, a cache subsystem 120, and an error manager 125.

The MML 115 receives and processes CXL mem requests from the front end 105 and sends read/write requests to the cache subsystem 120. The MML 115 further monitors and regulates a plurality of digital resource demands (e.g., buffer access) placed on the digital memory circuit by the plurality of data requests. The cache subsystem 120 receives provides internal caching for data received from the host 75, increasing the performance and power efficiency of the module.

An error manager 125 provides for optional low power chip kill (LPCK) error checking for stored data. A back end 140 provides the physical relay of data to/from the central controller 110 from/to the memory 90. A management subsystem 130 employs firmware 132 downloaded from a serial flash to configure various peripherals, performance optimization, error monitoring, device maintenance, temperature monitoring, VPD, etc.

The exemplary digital memory circuit 100 includes a number of data ports, which each data port having one or more memory buffers associated with it. Front end data is received-from/sent-to the host 75 via suitable CPU ports. Similarly, memory data (stored in RAM) is received-from/sent-to memory 90 via suitable memory ports. Given a limited number of ports, with each port having a fixed number of buffers, only a limited amount of data can be transferred via the digital memory circuit 100 during a given time period.

The digital memory circuit 100 may have one or more port allowance registers which store a maximum amount of data to be handled via various ports and buffers at any one time, or over a given time period. The digital memory circuit 100 may also have one or more threshold registers to store various threshold values, including for example, power consumption, maximum read/write, and other performance thresholds. (See Table 850 of FIG. 8, below.)

The digital memory circuit 100 includes the central controller 110 and one or more memory subsystems 105, 140, 130, on a chip or multiple chips. The embodiments improve reliability of the chip memory. The central controller 110 and the memory subsystems 105, 140, 130 are characterized in part by physical layer conditions parameters, that may include real-time operating temperature and real-time current usage or power draw.

The central controller 110 and the memory subsystems 105, 140, 130 are also characterized in part by processing layer performance parameters, which can include a number of memory buffers free or in use, or a number of data read/write commands being processed during a recent time interval.

Figure 2:
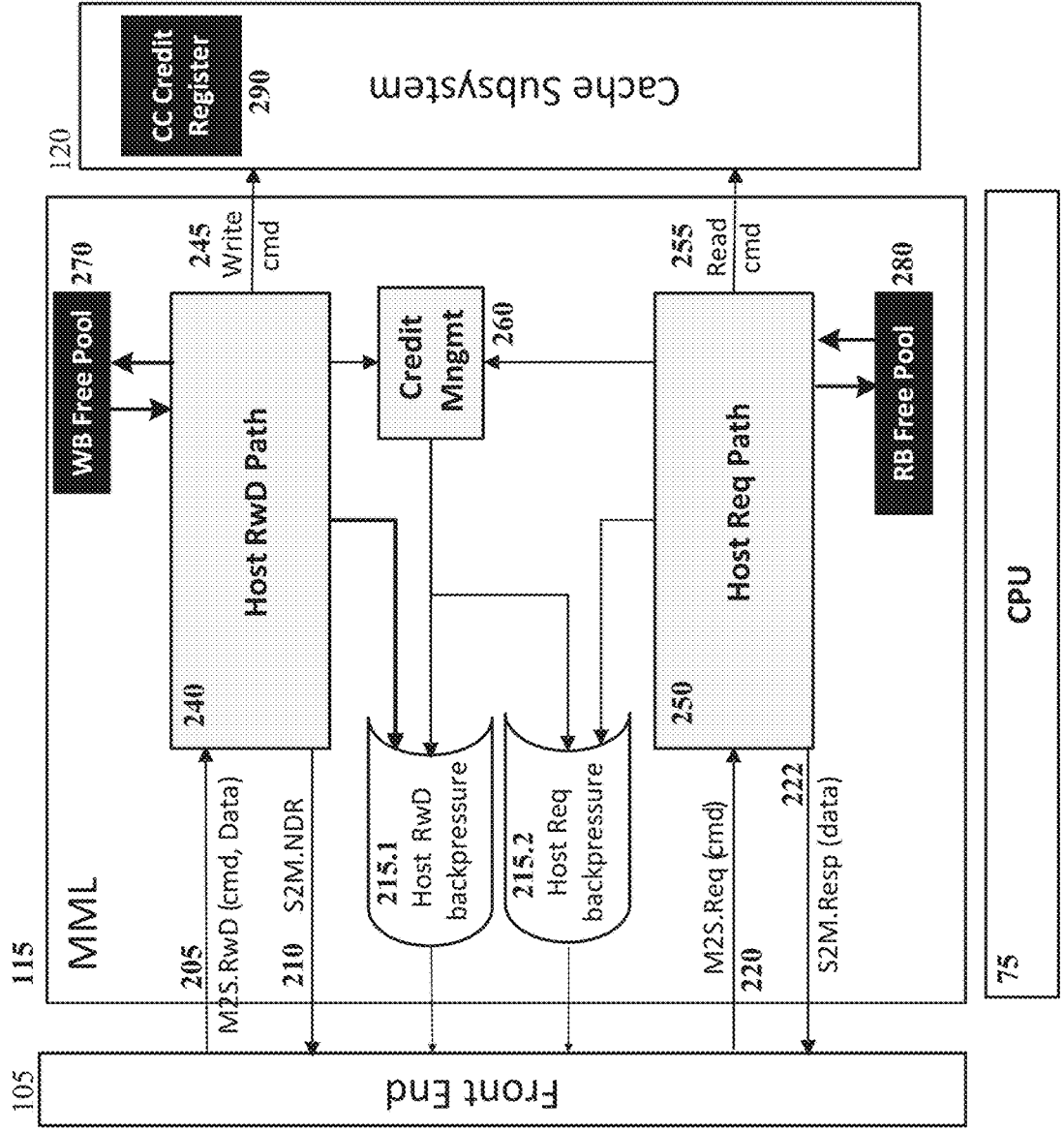
FIG. 2 illustrates an exemplary cache subsystem and an exemplary media management layer of a digital memory circuit.

FIG. 2 illustrates an exemplary cache subsystem 120 and an exemplary MML 115 such as may be found in the exemplary digital memory circuit 100 discussed above in conjunctions with FIG. 1. Along with possibly other functions, the exemplary MML 115 monitors and controls the volume of resource demands placed on the exemplary digital memory circuit 100.

The cache subsystem 120 may have one or more cache subsystem credit registers (CC credit registers) 290. The credit register(s) 290 may be used to track the number of read or write requests currently being processed by the cache subsystem 120.

In one embodiment, the MML 115 receives from the front end 105 various data write commands 205 for data storage, which are passed through a Host RwD Path 240, resulting in write commands 245 which are sent to the cache subsystem 120. The Host RwD Path 240 maintains a WB free pool 270 of available ports and buffers, which may also work in conjunction with the CC credit register 290 to track the amount of resources available for memory write commands 205.

Similarly, the MML 115 receives from the front end 105 various data read requests 220 for data storage, which are passed through a Host Req Path 250, resulting in read commands 255 which are sent to the cache subsystem 120. The Host Req Path 250 maintains an RB free pool 280 of available ports and buffers, which may also work in conjunction with the CC credit register 290 to track the amount of resources available for memory read commands 205.

In another embodiment, the MML 115 keeps track of the buffers in use per port and compares them to the CXL port buffer allowances registers. The Host RwD 240 processes MemWr and MemWrPtl requests, while the Host Req 250 processes MemRd, MemRdData, MemSpecRd, MemInv, and MemInvNTrequests.

In various embodiments, tracking may occur via any or all of the WB Free Pool 270, the CC Credit Register 290, and the RB Free Pool 280, for any or all of:
(i) the total number of read requests being processed,
(ii) the total numbers of write requests being processed,
(iii) the total number of requests of all kinds being processed, along with
(iv) available and allowed numbers of ports and buffers.

Tracking may also be performed additionally in combination with, or alternatively by, a credit management module 260.

In an embodiment, the Credit Management module 260 or some other module determines when a request to a particular port exceeds a read allowance or a write allowance for that particular port (indicating the number of available port buffers has fallen below a threshold). When such a determination is made, the MML 115 stops accepting from the particular port the respective request type until the buffers in use fall below the allowance.

In an embodiment, and in determining allowed threshold crossings, the MML 115, and in particular the credit management module 260, may also take into account not only read and write commands, but also the number of other commands running in central controller 110.

In an embodiment, the MML employs one or more backpressure modules 215 to signal to the front end 105 that no further requests can be processed. For example, a Host RwD backpressure module 215.1 may signal that no more data write commands 205 can be processed, either for some number of clock cycles or instruction time slots 305 (see FIG. 3), or until an affirmative signal is sent to indicate that write commands can be processed. For example, a change in a flag, such as a perf_throttling_rwd_backpressure flag (see FIG. 8 below) may be employed.

Similarly, a Host Req Backpressure module 215.2 may signal that no more data read commands 220 can be processed, either for some number of clock cycles or instruction time slots 305, or until an affirmative signal is sent to indicate that read commands 220 can be processed. A change in a flag (e.g., a perf_throttling_req_backpressure flag (see FIG. 8 below) may be employed rather than active signaling.

In general, the signaling may take the form of register flags or other flags which may be set in the MML 115, and which may be continuously read by the front end 105. Other forms of MML-front end signaling may be employed as well consistent with the embodiments.

Persons skilled in the relevant arts will appreciate that the foregoing signaling or flagging, as well as the methods of the various embodiments which follow, are typically expected to be employed during real-time operations of the ASIC 100, that is, when the host 75 is actively initiating memory read requests 220 and memory write requests 205.

In an embodiment, setting of a backpressure flag to '1' may indicate to the front end that no more requests may be accepted, while a '0' may indicate that more requests can be accepted.

In pseudocode form, and in one embodiment, Host RwD backpressure 215.1 (for write commands) may be set to '1' when:

(WB_Free_Pool_is_empty) OR
  (#CC_running_cmds==CC_credits_register)
Host Req (Read cmd) backpressure is set to '1' when:
(RB_Free_Pool_is_empty) OR
  (#CC_running_cmds==CC_credits_register)
meaning the MML 115 has asserted to the host 75 that no more data reads/writes are allowed.

Figure 3:
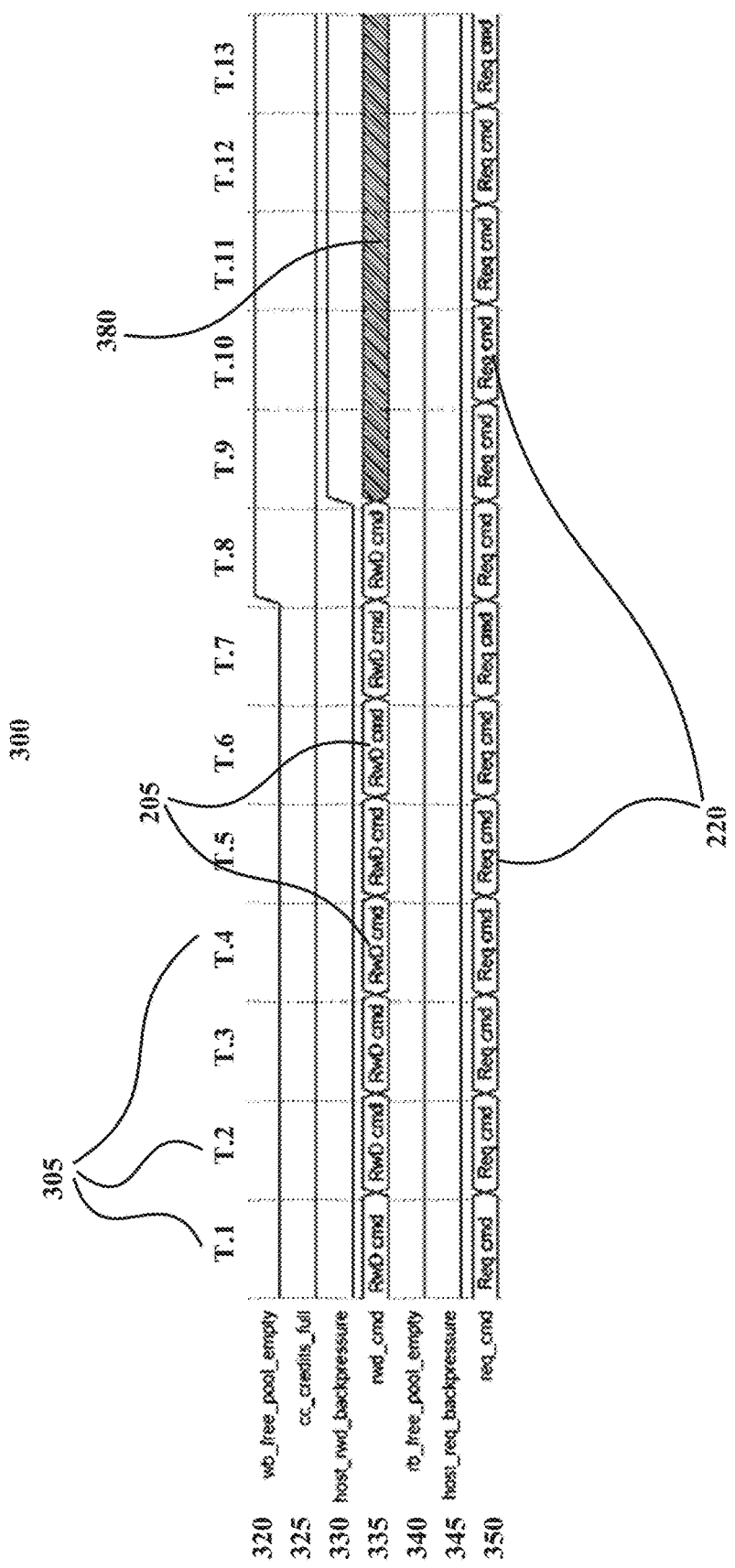
FIG. 3 illustrates an exemplary status timeline for memory operations.

FIG. 3 illustrates an exemplary status timeline 300 for read and write command allowances for an exemplary MML 115. The figure presents exemplary time slots 305 (T.1, T.2, . . . , T.13). Each time slot 305 represents a time required to process a data write 205 command (RwD) and/or a data read 220 command (Req).

During time slots T.1 through T.7, the exemplary digital memory circuit 100 receives a series of read commands (RwD_cmd) 205, as indicated by the RwD_cmd timeline 335. Throughout time slots T.1-T.7, a wb_free_pool_empty flag 320 asserts a '0', meaning that the WB free pool 270 is not empty and so has buffers available to receive the read commands 205 and associated data.

A cc_credits_full flag 325 also asserts '0', meaning that the cache 120 is not full and so also free to accept data. As a result, a host_rwd_backpressure flag 330 asserts '0' for time slots T.1-T.8 (this means that the MML 115 does not assert any back pressure on the front end 105). Consequently, at times T.8-T.13, the cache subsystem 120 remains able to accept new data.

However, at the outset of timeslot T.8, the credit management module 260 of the MML 115 asserts flag wb_free_pool_empty 320 (the flag is set to 'high' or '1'), indicating that the MML 115 has no more free data buffers to accept write commands RwD cmd 205. As a result, Host RwD Backpressure 215.1 is asserted in timeslot T.9. During times T.9-T.13, the entire time block 380 is a period during which the MML 115 does not accept data write requests 205. Further, if the entire computational system is functioning, the host 75 will not present any data write requests 205.

Substantially analogous considerations apply to data read requests 220 during time slots T.1 through T.13. However, because the rb_free_pool_empty flag 340 is not asserted (it remains at a 'low' or '0' value) throughout the intervals T.1 through T.13, the host_req_backpressure flag 345 is not asserted through the entire time. As indicated by the req_cmd timeline 350, data request commands req_cmd 220 may be received the entire time.

In one embodiment, then, when the WB Free Pool 270 is empty, the central controller 110 cannot receive host RwD commands 205 anymore from the host 75. The WB_Free_Pool_Empty flag 320 is set to '1', and the Host_RwD_backpressure flag 330 is set to '1', too. Host RwD commands 205' are then stopped, until a write buffer is again available.

Figure 4:
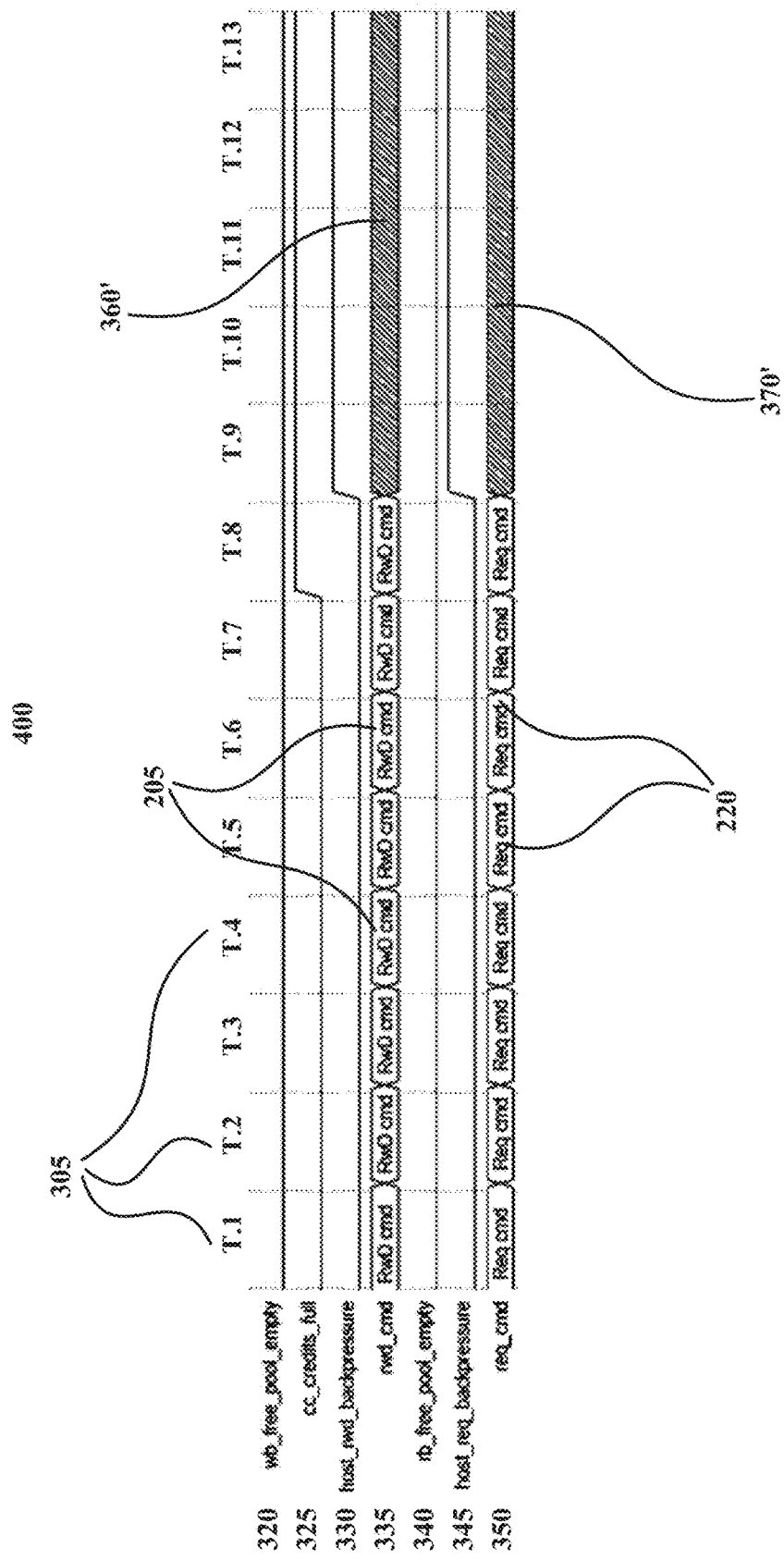
FIG. 4 illustrates an exemplary status timeline for memory operations.

FIG. 4 illustrates another exemplary status timeline 400 for read and write command allowances for an exemplary MML 115. As with status timeline 300 discussed above, the figure presents exemplary time slots T.1, T.2, . . . , T.13. Each time slot represents a time required to process a data write 205 command (RwD) and/or a data read 220 command (Req).

Many of the elements of timeline 400 are the same as elements of timeline 300, discussed above, and the details will not be repeated here. However, in timeline 400, the wb_free_pool_empty flag 320 is not asserted during any of time slots T.1-T.13. Since data write buffers remain available throughout the entire time interval, those buffers could receive data from the host 75 throughout the entire time interval.

It will be noted, though, that in timeline 400, the cc_credits_full flag 325 is asserted at the beginning of time slot T.8. This indicates that the CC credit register 290 indicates that the cache subsystem 120 no longer has sufficient available resources to process either of data read commands 220 or data write commands 205 from the host 75. Consequently, in subsequent time slots T.9-T.13, both of the host_rwd_backpressure flag 330 and the host_req_backpressure flag 345 are asserted. As a result, host RwD commands 205' and host Req commands 220' are both suppressed (blocked from being received or processed) for the duration of the time interval.

When CC Credits are all in use, the central controller 110 cannot receive host RwD 205 and host Req 220. The CC credits full signal 325 is set to '1', so Host RwD backpressure 330 and Host Req backpressure 345 signals are set to '1'. Host commands 205, 220 are stopped, until CC Credits are again available.

The embodiments provide approaches for an exemplary digital memory circuit 100 to block data read/write requests when the memory circuit temporarily lacks adequate internal resources (e.g., memory buffers and/or cache memory) to handle such requests. Even when internal resources are available, volume and frequency of ASIC-level I/O requests can be problematic, creating heat and/or power-level issues. Consequently, in some embodiments the digital memory circuit 100 may proactively reduce, or throttle performance levels, even when data buffers and cache memory remain available to prevent future problems.

Techniques for directly monitoring ASIC heat and power consumption are known in the art. As an example, power consumption may be determined by monitoring a level of electrical current drawn by the ASIC, or similar means. Accordingly, such techniques are not discussed in detail with respect to the exemplary ASIC 100.

In the embodiments, performance throttling is based on a combination of physical level monitoring (temperature, power consumption, radio frequency or magnetic signal leakage); logical error rate monitoring (such as numbers of parity errors detected and corrected); and resource-usage monitoring (numbers of read/write requests 205, 220 processed, numbers of buffers in use, etc.). In one example, real-time performance throttling can be based on the numbers of available ports or the amount of cache memory available, as tracked via exemplary elements such as free pools 270, 280 or a cache credit register 290. In this example, performance of the digital memory circuit 100 is throttled when threshold criteria 860, 865, 870, 875 are exceeded.

In one alternative embodiment, the MML 115 utilizes on-board firmware (FW) 562 to manage temperature and power consumption sensing and temperature/power-based performance throttling configuration, while performance monitoring hardware (HW) manages the generation of backpressure signals 215.1, 215.2. (Inside the Management Subsystem 130 (See FIG. 1) there's an internal CPU (not shown in the figures). On that CPU, firmware 132 (see FIG. 1) is executed. By contrast, the performance throttling block 562 is hardware only, but is configured by the firmware 132.)

In a second alternative embodiment, firmware 132 manages all of temperature/power consumption sensing, performance monitoring, and manages the backpressure signals. The firmware 132 can run on the host 75 and may regulate the MML 115 by dynamically adjusting the CC credits register 290 of the cache controller 110. Thus, throttling management dynamically adapts to ASIC workload characteristics.

Figure 5:
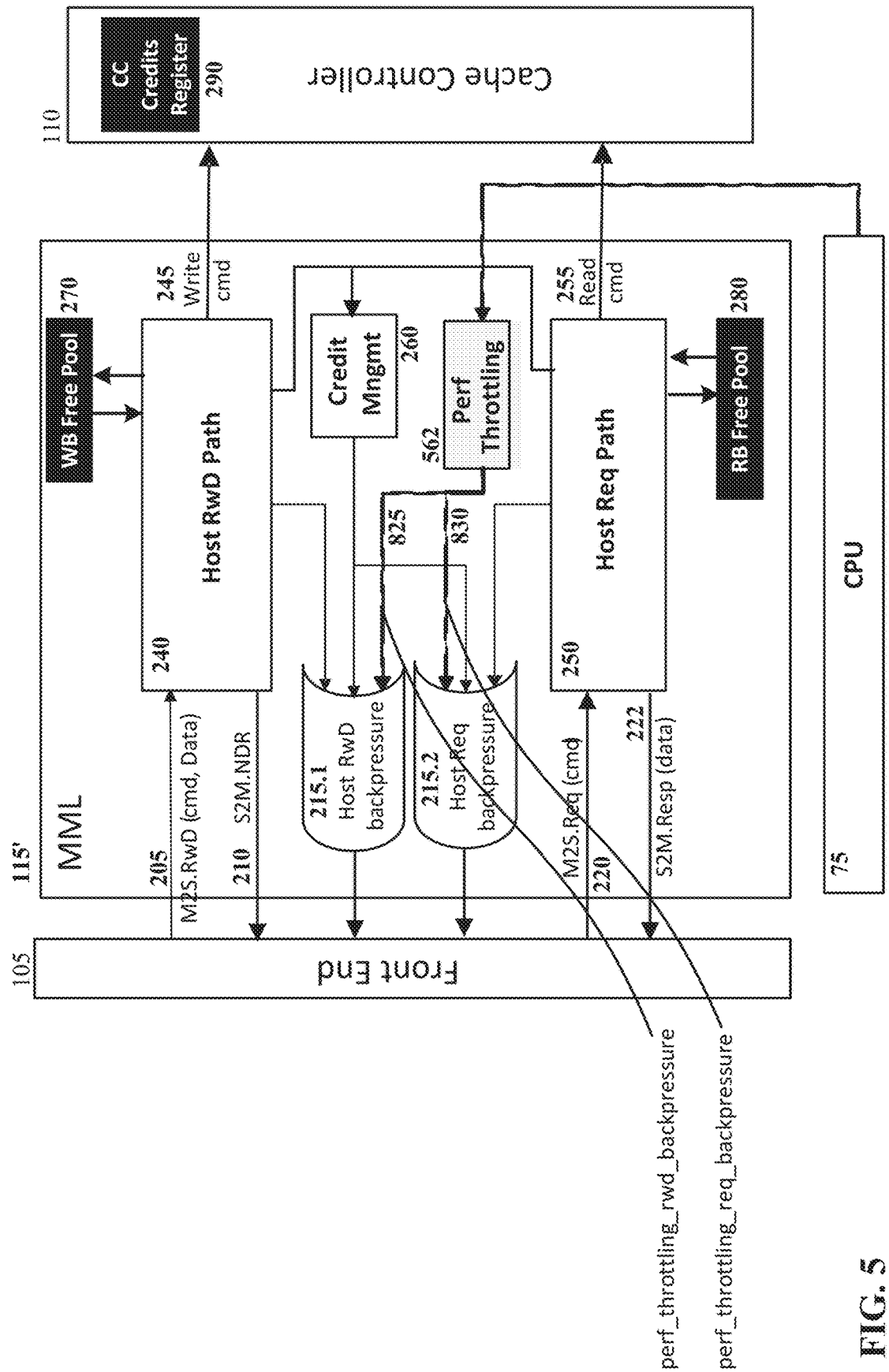
FIG. 5 illustrates an exemplary cache subsystem and an exemplary media management layer of a digital memory circuit.

FIG. 5 illustrates an exemplary CXL media management layer 115' according to some embodiments. The exemplary MML 115' is similar to the exemplary MML 115 illustrated in FIG. 2 above, and descriptions of same or similar elements will not be repeated here.

Exemplary CXL MML 115' includes a hardware-based performance throttling block (PTB) 562. The performance throttling block 562 is communicatively coupled with the host 75 and delivers flag or signal outputs to the host RwD backpressure module 215.1 and the Host Req backpressure module 215.2.

Via suitable temperature sensor(s) and/or current/power sensors (not shown), the host 75 reads the temperature and power consumption values for exemplary ASIC 100 of FIG. 1. Persons skilled in the relevant arts will appreciate that either or both of the temperature sensor and/or the current/power sensor may be integrated into the ASIC 100 or proximate to the ASIC 100.

If the ASIC temperature value exceeds a safe temperature threshold, the host 75 sends a temperature warning signal (perf_throttling_enable) 820 to the exemplary performance throttling block 562. Similarly, if the ASIC power consumption exceeds safe power consumption threshold, the host 75 sends a power warning signal 820 to the performance throttling block 562.

In an embodiment, separate signals 825 may be employed for instances where a temperature threshold is exceeded and where a power threshold is exceeded. In an alternative embodiment, a common signal 825 may be employed for either case of excess temperature or excess power consumption.

Once the exemplary performance throttling block 562 receives a signal that power or heat thresholds have been exceeded, the performance monitoring block communicates backpressure 215.1, 215.2 to the front end 105 of the digital memory management ASIC 100.

As discussed above, the MML 115 employs one or more backpressure modules 215.1, 215.2, to signal to the front end 105 that no further service read/write requests can or will be processed. As defined herein, backpressure implies that even if additional read or write requests could be processed, no further read or write requests should be processed to reduce system heat and/or system power consumption.

The performance throttling block 562 communicates backpressure to the front end 105 via backpressure modules 215. The performance throttling backpressure signals 825, 830 (see FIG. 8, below) are put into logical OR with the free pool empty signals and CC Credits Full signals (not shown).

Further, these signals can be modulated separately and differently for the Host RwD path 205, 210, 215.1 and for and the Host Req path 220, 222, 215.2 via registers set by firmware 132. This may be done, in whole or in part, by setting various thresholds 855, 860, 870, 875, stored in system registers, for temperature thresholds, current thresholds, and performance throttling levels.

Figure 6:
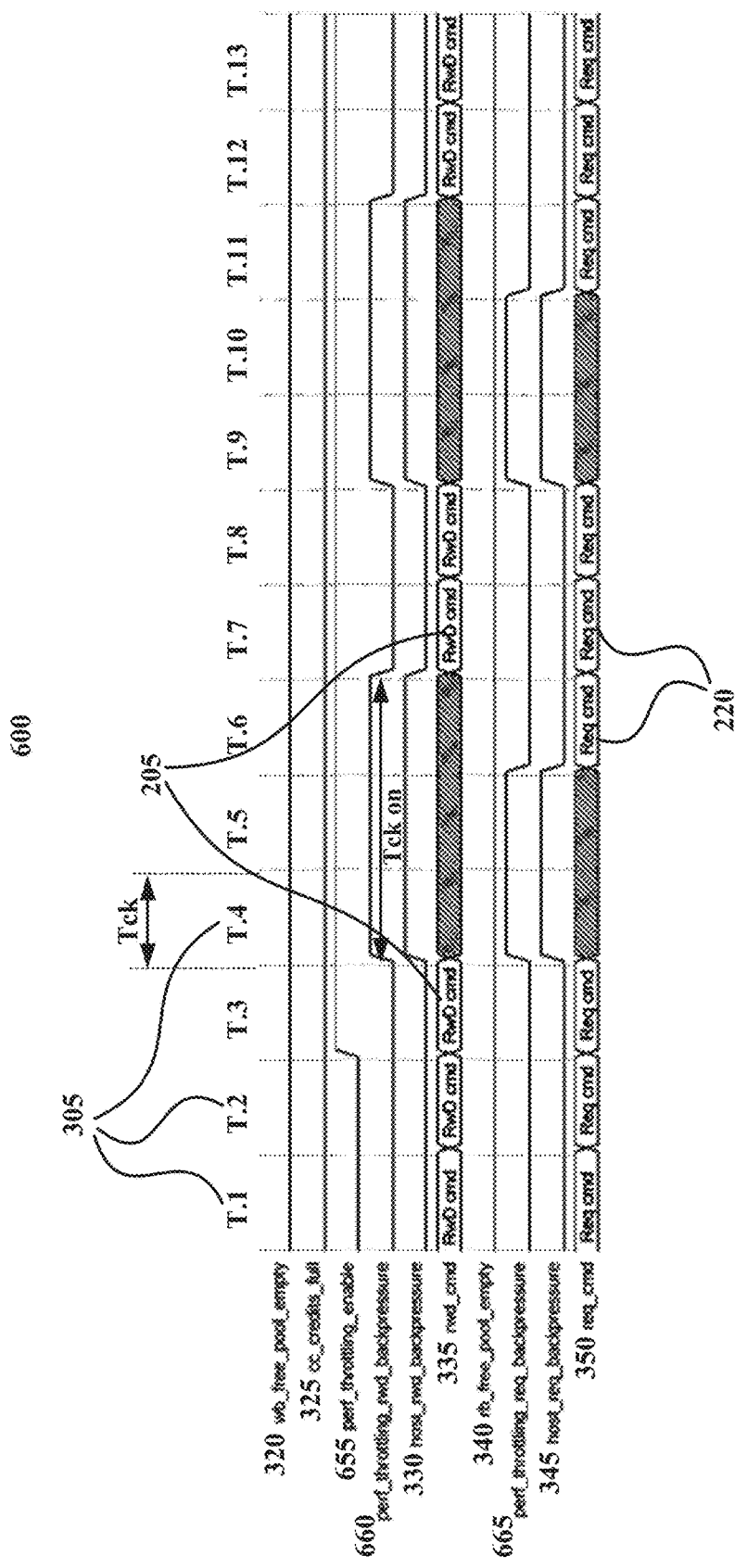
FIG. 6 illustrates an exemplary status timeline for memory operations.

FIG. 6 illustrates another exemplary status timeline 600 for read and write command allowances for an exemplary MML 115. As with status timelines 300, 400 discussed above, the figure presents exemplary time slots T.1, T.2, ..., T.13. Each time slot represents a time required to process a data write 205 command (RwD) and/or a data read 220 command (Req).

Many of the elements of timeline 600 are the same as elements of timelines 300, 400, discussed above, and the details will not be repeated here. However, in timeline 600, the wb_free_pool_empty flag 320 is not asserted during any of time slots T.1-T.13. Similarly, the cc_credits_full flag 325 is also not asserted during of time slots T.1-T.13. Since data write buffers and data read buffers remain available throughout the entire time interval T.1-T.13, those buffers could in principle receive/write data from/to the host 75 throughout the entire time interval.

In exemplary timeline 600, a performance throttling flag 655 flag is asserted at the beginning of time slot T.3. This flag indicates that either or both of the firmware 132 running on the internal CPU and the performance throttling block 562 are now configured to monitor ASIC-level performance and to throttle ASIC-level performance when various threshold criteria are exceeded.

The performance throttling flag 655 may be asserted upon system startup or shortly after system startup or when a temperature/power thresholds are exceeded. Other environmental or electrical factors (e.g., increased ambient temperature or a rise in detected system-level bit error rates) may trigger the performance throttling flag (perf_throttling_enable) 655.

Once the performance throttling flag 655 is set, the performance throttling block 562 of the MML 115' assesses when the performance of the exemplary digital memory circuit 100 exceeds performance thresholds.

Consistent with exemplary timeline 600, the performance monitoring block 562 may determine that certain performance thresholds have been exceeded, and that system reads or system writes should therefore be suspended for a certain number of time slots T.j, ... T.j+k. The thresholds and/or the number of time slots may be obtained for example from values stored in suitable registers, such as a write (ThrottlingLevel_RwD) throttling level register 870 and a read (ThrottlingLevel_Req) register 875 (see again FIG. 8, Table 850).

In the exemplary timeline 600, and possibly in some embodiments responsive to the crossings of write thresholds, the perf_throttling_rwd_backpressure flag 660 is asserted at time slots T.4 and again at T.9. Consequently, the host_rwd_backpressure flag 330 prevents further data writes during time slots T.4-T.6 and again during time slots T.9-T.11. These are instances of the throttling of data writes to reduce power consumption and overall heating. Similarly, the perf_throttling_req_backpressure flag 665 is asserted at time slots T.4 and T.9. Consequently, the host_req_backpressure flag 345 prevents further data reads during time slots T.4-T.5 and T.9-T.10.

Figure 7:
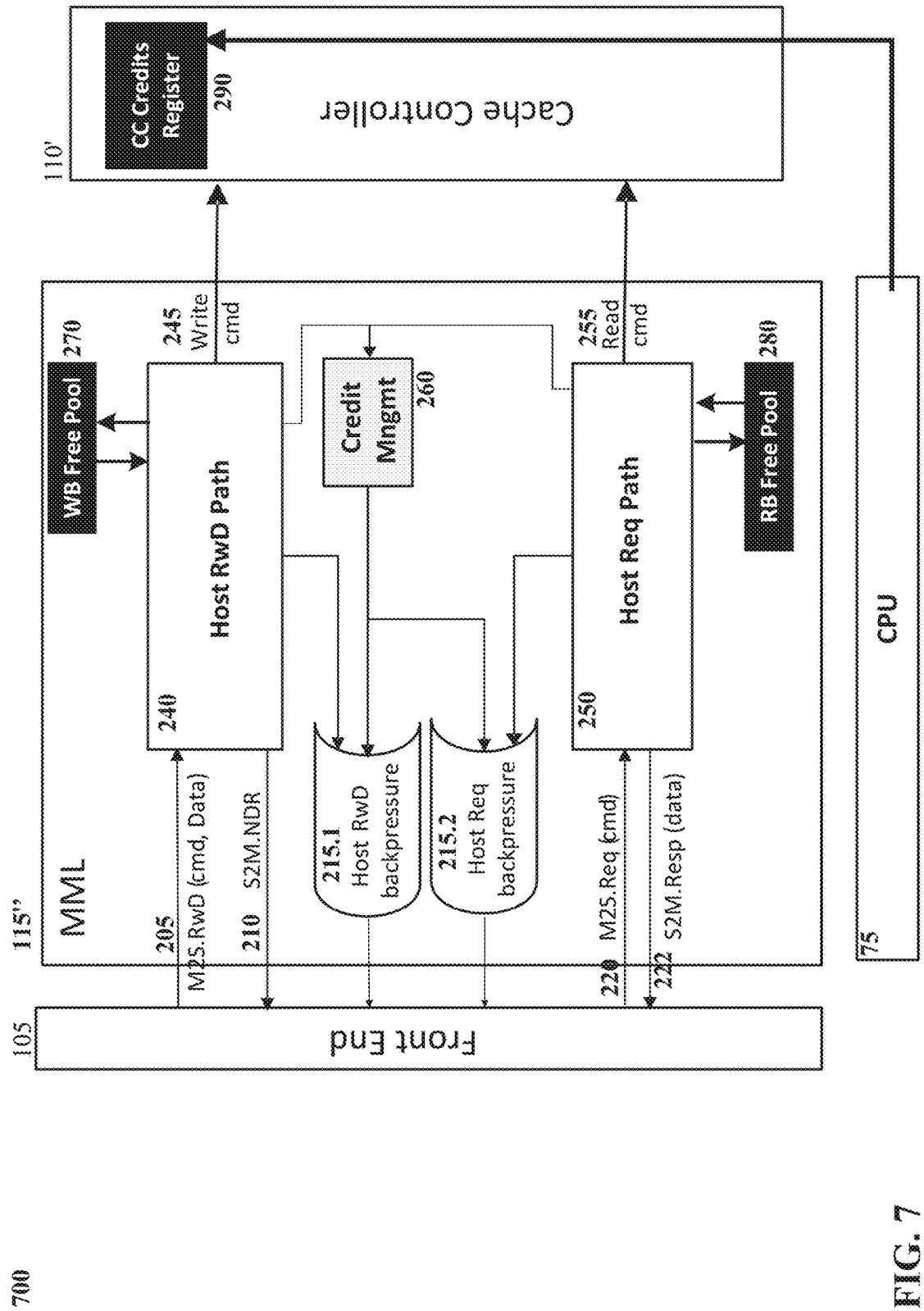
FIG. 7 illustrates an exemplary cache subsystem and an exemplary media management layer of a digital memory circuit.

FIG. 7 illustrates an exemplary CXL media management layer 115" and a cache controller 110' according to some embodiments. The exemplary MML 115" is similar to the exemplary MML 115 illustrated in FIG. 2 above, and descriptions of same or similar elements will not be repeated here. It will be noted that, unlike the exemplary MML 115' of FIG. 5 above, exemplary MML 115" of FIG. 7 does not include a performance throttling block 562. This approach reduces the amount of required hardware while still achieving performance throttling.

As depicted in FIG. 7, the host 75 is directly coupled to the CC Credits Register 290 of Cache Controller 110'. The host 75 can therefore modulate the allowed number of cache controller credits. For example, the host 75 can decrease the allowed number of cache control credits to set the listed number of available buffers less than the actual number of buffers. This limits the number of memory buffers visible to the cache controller 110, thus restricting the total throughput of the digital memory circuit 100, ultimately reducing heat and power consumption.

The host 75 reads temperature and power consumption values. If these values exceed respective temperature and power threshold 860 or 865, the host 75 sets the central controller credits register 290 to compensate. An exemplary pseudo code for adjustments to the credits register 290 may read:

```
throttling_evaluation_function {
    if (throttling_condition) then
        cc_credits_register=credits_register−credit_
            step_register
    else
        cc_credits_register=cc_credits_register+credit_
            step_register
}
```

The maximum number of CC Credits can be modulated until temperature/power consumption returns to below a designated safe threshold. The credit management module 260 is configured to assert backpressure when a number of credits in the CC credit register 290 falls below a designated minimum threshold value. The host 75 can throttle the digital memory circuit 100 by adjusting the designated minimum threshold value for the CC credit register 290.

FIG. 8 illustrates exemplary system signals (Table 810) and system registers (Table 850), according to the embodiments. In general, suitable registers (e.g., the exemplary registers 850) of the management subsystem 130 or the central controller 110 store the various threshold values for physical layer and processing layer performance conditions. Thresholds 860, 865, 870, and 875 are among the exemplary thresholds discussed above.

Figure 9:
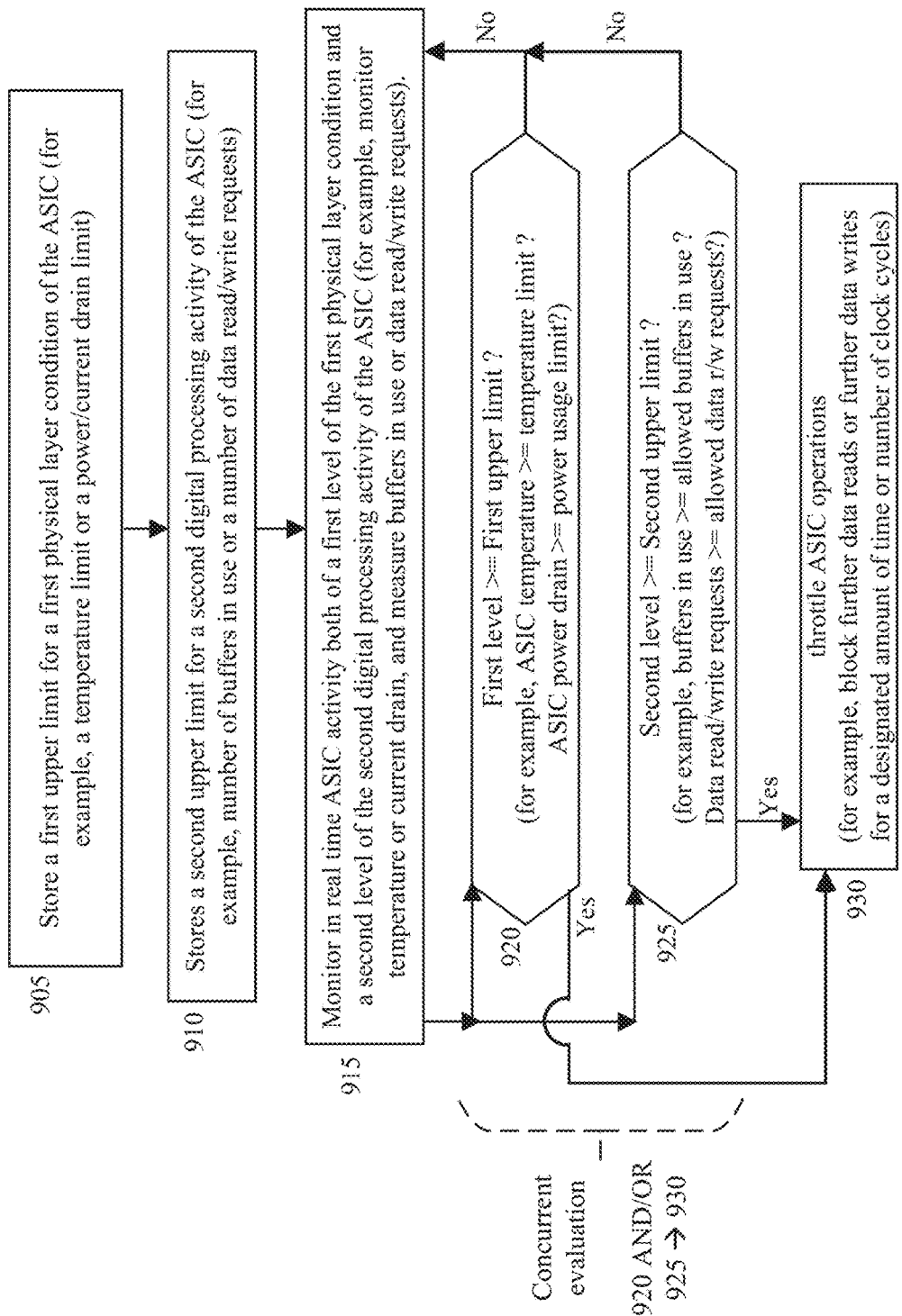
FIG. 9 illustrates an exemplary method of practicing an embodiment of the present disclosure.

FIG. 9 presents a flow chart of an exemplary method 900 of achieving performance throttling in the ASIC 100 according to the embodiments. In FIG. 9, the host 75 coupled stores a first upper limit for a first physical layer condition of the ASIC 100 in block 905. In block 910, the host 75 stores a second upper limit for a second digital processing activity of the ASIC 100.

In block 915, the host 75 monitors in real time ASIC activity of a first level of the first physical layer condition and a second level of the second digital processing activity of the ASIC 100.

Blocks 920 and 925, described here, may operate substantially concurrently. In block 920, the host 75 compares the first level against the first upper limit for a physical layer condition and determines in real time if the first level exceeds the first upper limit. For example, the host 75 or management subsystem 130 may determine if physical layer limits such as temperature or power consumption exceed their corresponding upper limits. In block 925, the host 75 compares the second level against the second upper limit for a digital processing activity and determines in real time if the second level exceeds the second upper limit. For example, the management subsystem 130 may determine that the number of buffers in use exceeds an allowed number of buffers, or that the data read/write requests exceeds allowed limits.

In block 930, upon determining whether the first and second levels respectively exceed the first and second upper limits, the method 900 throttles a third digital activity of the ASIC 100 to reduce a level thereof.

Returning to the performance throttling block 562, and as noted above in conjunction with FIG. 2, in an embodiment the performance throttling block 562 may be implemented as hardware (for speed and efficiency) in the form of application specific digital logic, though it's operations or operating parameters may be modified via firmware.

The performance throttling block 562 may rely on various input signals, including for example: (i) an input Clock 305 for clock cycles and/or instruction cycles; (ii) a Performance Throttling Enable 655 which reflects that temperature or power consumption limits have been exceeded; and (iii) a workload type 1004: the traffic type that is coming from the host in terms of read percentage or write percentage (for example, 70% read).

Output signals from the performance throttling block 562 may include: (i) Performance Throttling RwD backpressure 205: communicates write command backpressure to the Front End 105; and (ii) Performance Throttling Req backpressure 220: communicates read command backpressure to Front End 105.

By way of exemplary operations, when enabled the performance throttling block 562 responds to backpressure signals on the basis of workload type signal. For example, if traffic is composed mostly of data request commands, the performance throttling block can stop data requests for some configurable period (for example, 50 Tck, that is, 50 clock ticks). After that period, the throttling condition is checked again and, if it persists, data request commands can be modulated, that is, partially allowed (for example, they can be stopped for 20 Tck and enabled for 30 Tck). Then the throttling condition is checked again and, if it persists, data read commands can be further reduced.

In general, the modulation of data read commands or data write commands can be fine-tuned via this modulation, balancing memory traffic load with host system requirements, according to configurable parameters for the performance throttling block 562.

Figure 10:
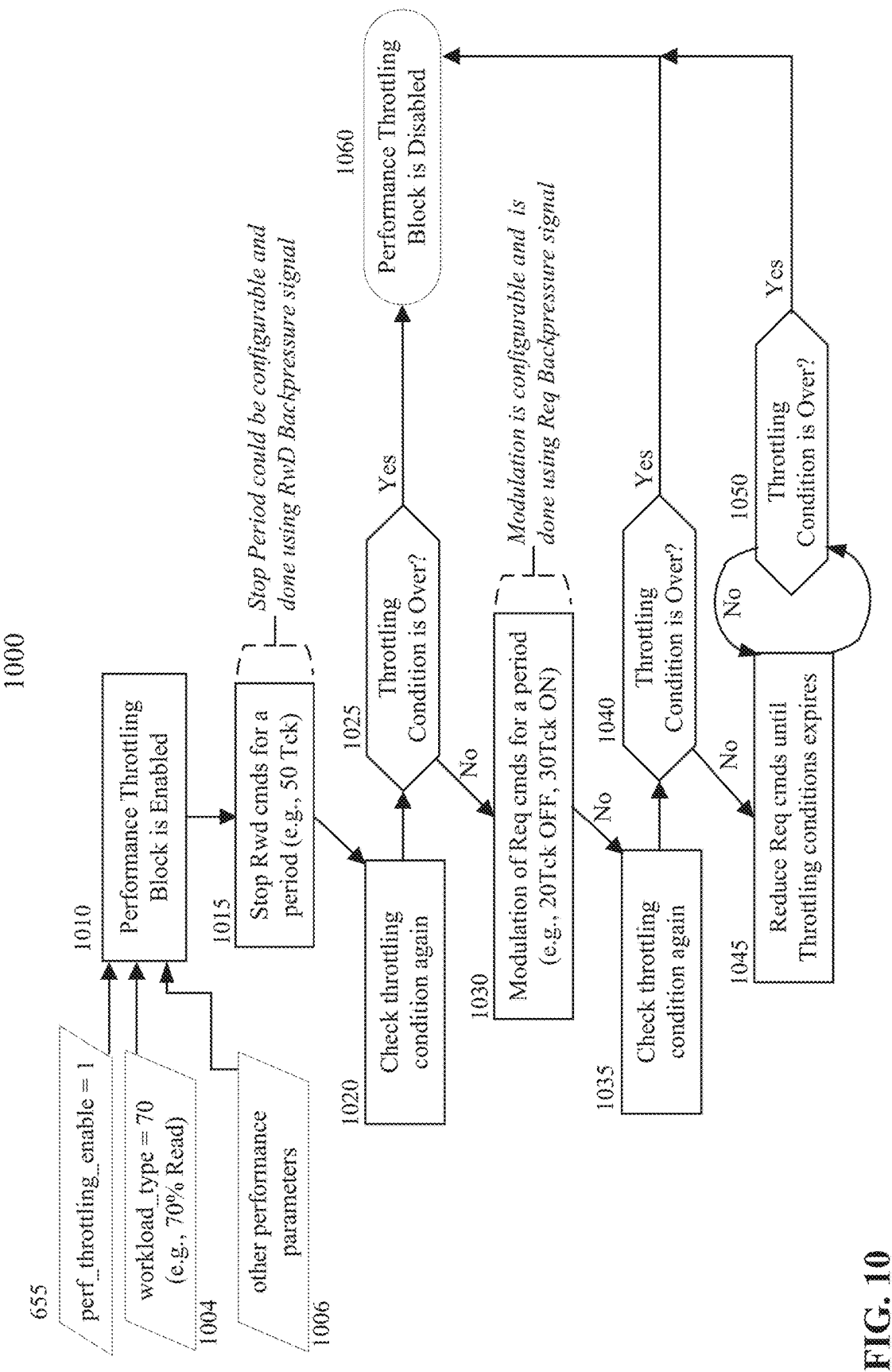
FIG. 10 illustrates an exemplary method of practicing an embodiment of the present disclosure.

When the throttling condition is over, backpressure signals can be set back to 0 (zero or "off"), and host traffic returns to normal behavior FIG. 10 presents a flow chart of an exemplary method 1000 of achieving performance throttling via a performance throttling block 562 according to the embodiments. The exemplary method 1000 incorporates a particular throttling scenario, which is for purposes of exposition and illustration only; persons skilled in the relevant arts will appreciate that other scenarios are possible within the scope of this disclosure and the appended claims.

The method begins at step 1010, where the performance throttling block 562 is enabled upon receiving a perf_throttling_enable signal 665 from the host 75, and also receiving a workload_type signal or message 1004. In the example shown, the workload type is a 70% read command load. In an embodiment, the performance throttling block 1010 may receive other memory performance parameters 1006 as well from either the host 75 (via the front end 105), or from other modules of the CXL 100 such as the management subsystem 130.

The method continues with step 1015. In step 1015, the performance throttling block 562 stops Rwd commands (write commands) 205 for a specified number of clock cycles, which may be configurable.

Following the passage of the specified number of clock cycles, in steps 1020 and 1025 the performance throttling block 562 checks if the throttling condition (perf_throttle_enable) is still being asserted (that is, perf_throttle_enable=1). If the throttling condition is no longer asserted (the throttling condition is finished, perf_throttle_enable=0), the method concludes at step 1060 where performance throttling is disabled. This means that normal processing of memory requests, with no throttling, is resumed.

If in steps 1020 and 1025 it is determined that the throttling condition is still asserted, the method continues with step 1030. In step 1030, a number of allowed memory commands may be modulated for some period of time (fifty instruction clock ticks in the example shown). In the example shown, the modulation pertains to limiting the allowed number of memory read commands 220. Rather than shutting down read or write commands completely, modulation may entail allowing for only a reduced number of commands to be processed in the specified number of cycles, for example by limiting the number of clock cycles that may be allowed for processing read/write commands.

Following the completion of the number of clock cycles specified in step 1030, in steps 1035 and 1040 the performance throttling block 562 checks if the throttling condition (perf_throttle_enable) is still being asserted. If the throttling condition is no longer asserted (the throttling condition is finished), the method concludes at step 1060 where performance throttling is disabled. This means that normal processing of memory requests, with no throttling, is resumed.

If in steps 1035 and 1040 it is determined that the throttling condition is still asserted, the method continues with step 1045. In step 1045, a number of allowed memory commands, either memory requests or memory reads or both, may be modulated or limited for some specified period of time. In an embodiment and cycling back and forth between steps 1045 and 1050, read requests or write requests may be limited, in some specified or configurable manner, until it is determined in step 1050 that the throttling condition is concluded.

Once it is determined in step 1050 that the throttling condition is no longer asserted (the throttling condition is finished), the method concludes at step 1060 where performance throttling is disabled. This means that normal processing of memory requests, with no throttling, is resumed.

It will be observed that, in general, and in varied embodiments, a throttling condition pertaining to excess read requests 220 may result in a throttling of read requests, a throttling of write requests, or some combination of throttling read and write requests. In a similar manner, a throttling condition pertaining to excess write requests 205 may result in a throttling of read requests, a throttling of write requests, or some combination of throttling read and write requests.

For a given, specified duration of clock cycles, different subsets of the clock cycles may be employed to block memory read and memory write commands altogether; or to allow read commands but not write commands; or to allow write commands but not read commands. Other, combined or serial or parallel read/write throttling variations may be envisioned as well. Such variations may be programmable via firmware, or via dynamic control from the host 75 or the management subsystem 130.

In an embodiment, a lookup table or other logic (hardwired or programmable) may be employed to determine the type(s) and duration(s) of throttling to be employed, based for example on the workload_type, and/or based on other supplied performance parameters 1006. In an embodiment, the workload_type 1004 or other performance parameters 1006 may be updated in real-time, so that the performance throttling block 562 can fine-tune the ongoing throttling conditions in accordance with hardwired or firmware-based logic or lookup tables. That is, if there are a variety of time-successive/sequential determinations that memory request throttling is required, then the performance throttling block 562 may issue multiple, time-successive memory throttling commands which are appropriate to current memory demands from the host system 75.

In embodiments, a hardware performance throttling block 562 may be understood as a subprocessor of the overall memory management system 100 and of the central controller 110 in particular. The performance throttling block may therefore also be referred to as a performance regulating subprocessor (PRS) 562 or performance throttling subprocessor (PTS) 562. The performance throttling block 562 includes (or may be linked to, via suitable buses onboard the applicable ASIC) any hardwired logic; programmable logic; and any registers or local memory; and/or data queues, instruction queues; or arithmetic, counter, or logic registers necessary to perform the operations described in this document.

The performance throttling block 562 receives memory service requests, from the host system 75, in the form of memory read requests 220 and memory write requests 205. The host system 75 may also send requests to throttle, that is, to limit the responses of the memory system in response to memory requests; the host system may also send to the memory system various parameters 1004, 1006 indicative of current memory usage.

In response to the throttling request, the performance throttling block 562 either stops any reception of memory requests, or limits (throttles) the number of memory requests (either read requests, write requests, or both) for a specified number of clock/command cycles. The performance throttling block 562 also determines when full, unthrottled performance may be resumed.

In general, it is desirable to have an ASIC that possesses self-regulatory systems which can decrease a rate of ASIC performance or decrease an intensity of ASIC operations. These decreases can reduce physical-layer degradation of ASIC performance and lifespan.

In legacy systems, it may be known to detect internal ASIC power consumption or ASIC temperature; and further, to have an ASIC reduce its internal computational processing intensity when certain upper-limit thresholds are crossed. Further ASIC speed, such as clock frequency, may vary according to settings made by the ASIC itself or by the CPU. The ASIC speed may itself affect both heat and power consumption, but is a factor inherently known to the ASIC or the ASIC's controller or the CPU.

However, ASICs employing such regulation systems may be responsive to a problem, or potential problem, only in response to physical layer conditions (for example, excess heat or excess power consumption); and/or in response to detected error conditions (e.g., detection of the number of memory parity errors increasing beyond an allowed threshold).

Persons skilled in the relevant arts will appreciate that, when safe performance thresholds are crossed—for example, if temperature thresholds, power consumption thresholds, or error rate thresholds are exceeded—then a commonly used safety response is to have the ASIC throttle its own performance.

The embodiments provide dynamic, real-time ASIC internal regulation of the ASIC's own performance, where such regulation is triggered in response to conditions other than or in addition to crossing threshold parameter for physical layer conditions. That is, it is desirable to prevent performance threshold crossings by detecting and processing factors in addition to ASIC temperature, ASIC power consumption, and/or ASIC error rates. The embodiments may trigger regulation based on pro-active anticipation of a risk of physical layer problems before actual detection of such problems.

Employed are alternative sensing and threshold criteria in addition to heat/power/error detection to provide anticipatory regulation for temperature sensors and power consumption on the ASIC. ASIC performance may be temporarily reduced in rate, volume, or intensity (i.e., throttled). This throttling can prevent heat and power problems, thus avoiding critical conditions for the device based on sensed criteria other than heat, power, or error rates.

If an ASIC receives too many service requests too quickly, and/or also for too long, the result may be unacceptable outcomes. For example, the outcomes may include: (i) increases in ASIC power consumption beyond safe limits; (ii) increases in ASIC temperature beyond safe thresholds; (iii) an increased risk of undesirable cross talk between ASIC circuit elements (which may result in processing errors, such as increases in errors in memory reads); and (iv) other forms of unwanted changes in ASIC operations. These changes, such as excess power consumption, excess heat, cross talk, and similar physical level problems, may cause short-term problems with ASIC performance. In some cases, if performance demands cross certain thresholds, these demands may reduce the operational life span of the ASIC.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present disclosure can be implemented by software, firmware, hardware (or hardware represented by software such, as for example, Verilog or hardware description language instructions), or a combination thereof. After reading this description, it will become apparent to a person skilled in the relevant art how to implement the disclosure using other memory systems or architectures.

It should be noted that the simulation, synthesis and/or manufacture of the various embodiments of this disclosure can be accomplished, in part, through the use of computer readable code, including general programming languages (such as C or C++), hardware description languages (HDL) including Verilog HDL, VHDL, Altera HDL (AHDL), or other programming and/or computer automated design (CAD) tools.

This computer readable code can be disposed in any known computer usable medium including semiconductor, magnetic disk, optical disk (such as CD-ROM, DVD-ROM) and as a computer data signal embodied in a tangible computer usable (e.g., readable) transmission medium (including tangible digital, optical, or analog-based medium). Further, the computer readable code may be transmitted over communication networks, both wired and wireless, including the Internet and intranets. Further, the computer readable code may be transmitted via modulated carrier waves, including but not limited to radio waves, microwaves, and light emissions, where a distinctive pattern of modulation imposed on the carrier wave(s) corresponds to and conveys the computer readable code.

The Detailed Description section, and not the Abstract section, is intended to be used to interpret the claims. The Abstract may set forth one or more but not all exemplary embodiments of the present disclosure as contemplated by the inventor(s), and thus, is not intended to limit the present disclosure and the appended claims in any way.

What is claimed is:

1. A method comprising:
   receiving at a performance throttling block (PTB) of a memory management system (MMS) a throttling instruction to throttle the memory performance of the MMS; and
   in response to the receipt of the throttling instruction, issuing by the PTB a backpressure command to throttle the performance of the MMS, wherein the backpressure command comprises at least one of a backpressure command to throttle memory read commands and a backpressure command to throttle memory write commands;
   wherein in response to the backpressure command the MMS is configured to reduce a number of memory read requests and/or memory write requests which are processed by the MMS during a designated number of instruction clock cycles; and
   wherein the PTB issues a second backpressure command which is a different backpressure command from a first backpressure command and issued after a passage of multiple instruction clock cycles from the first backpressure command, wherein the PTB is configured to issue a plurality of time-sequential, respective backpressure commands appropriate to a plurality of different workload types of the MMS.

2. The method of claim 1, wherein the method further comprises:
   making a determination via the PTB that a throttling condition associated with the throttling is concluded; and
   upon making the determination, terminating via the PTB the throttling condition.

3. The method of claim 1, wherein issuing by the PTB the backpressure command comprises issuing a command to the MMS to completely cease processing memory read requests and/or memory write requests for the designated number of instruction clock cycles.

4. The method of claim 1, wherein issuing by the PTB the backpressure command comprises issuing a command to the MMS to modulate memory read requests and/or memory write requests for the designated number of instruction clock cycles, wherein modulating the memory requests comprises processing memory requests for a first subset of a total designated number of instruction clock cycles and not processing memory requests for a second subset of the total number of designated clock cycles.

5. The method of claim 1, wherein the method further comprises issuing a respective plurality of backpressure commands, by the PTB to the MMS, responsive to a plurality of respective, successive determinations by the PTB that a throttling condition remains active.

6. The method of claim 1, wherein a type of backpressure command issued by the PTB is determined based on one or more current performance parameters of the MMS.

7. The method of claim 6, wherein the one or more current performance parameters of the MMS comprises a workload type of the MMS.

8. The method of claim 6, wherein the one or more current performance parameters of the MMS comprises at least one of a percentage of current reads and a percentage of current writes.

9. A performance regulating subprocessor (PRS) of a memory management system (MMS), wherein said PRS comprises:
   application specific digital logic configured to:
      receive at the PRS of the MMS a throttling instruction to throttle the memory performance of the MMS; and
      in response to the receipt of the throttling instruction, issue by the PRS a backpressure command to throttle the performance of the MMS, wherein the backpressure command comprises at least one of a backpressure command to throttle memory read commands and a backpressure command to throttle memory write commands;

wherein in response to the backpressure command, the MMS is configured to reduce a number of memory read requests and/or memory write requests which are processed by the MMS during a designated number of instruction clock cycles; and wherein the PRS is further configured to issue a second backpressure command which is a different backpressure command from a first backpressure command and issued after a passage of multiple instruction clock cycles from the first backpressure command, wherein the PRS is configured to issue a plurality of time-sequential, respective backpressure commands appropriate to a plurality of different workload types of the MMS.

10. The PRS of claim 9, wherein said PRS further comprises application specific digital logic configured to:
make a determination that a throttling condition associated with the throttling is concluded; and
upon making the determination, terminate the throttling condition.

11. The PRS of claim 9, wherein said PRS further comprises application specific digital logic configured to:
issue the backpressure command as a command to the MMS to completely cease processing memory read requests and/or memory write requests for the designated number of instruction clock cycles.

12. The PRS of claim 9, wherein said PRS further comprises application specific digital logic configured to:
issue the backpressure command to the MMS to modulate memory read requests and/or memory write requests for the designated number of instruction clock cycles, wherein modulating the memory requests comprises processing memory requests for a first subset of a total designated number of instruction clock cycles and not processing memory requests for a second subset of the total number of designated clock cycles.

13. The PRS of claim 9, wherein said PRS further comprises application specific digital logic configured to:
issue a respective plurality of backpressure commands, by the PRS to the MMS, responsive to a plurality of respective, successive determinations by the PRS that a throttling condition remains active.

14. The PRS of claim 9, wherein said PRS further comprises application specific digital logic configured to:
issue a performance-specific type of backpressure command determined based on one or more current performance parameters of the MMS.

15. The PRS of claim 14, wherein said PRS further comprises application specific digital logic configured to:
issue the performance-specific type of backpressure command as determined based on a workload type of the MMS.

16. The PRS of claim 14, wherein said PRS further comprises application specific digital logic configured to:
issue the performance-specific type of backpressure command as determined based on at least one of a percentage of current reads and a percentage of current writes.

\* \* \* \* \*